April 24, 1962 P. J. ARCIDIACONO 3,031,017
CYCLIC PITCH CONTROL
Filed Sept. 30, 1959 3 Sheets-Sheet 1

INVENTOR
PETER J. ARCIDIACONO
BY Leonard F. Weblind
ATTORNEY

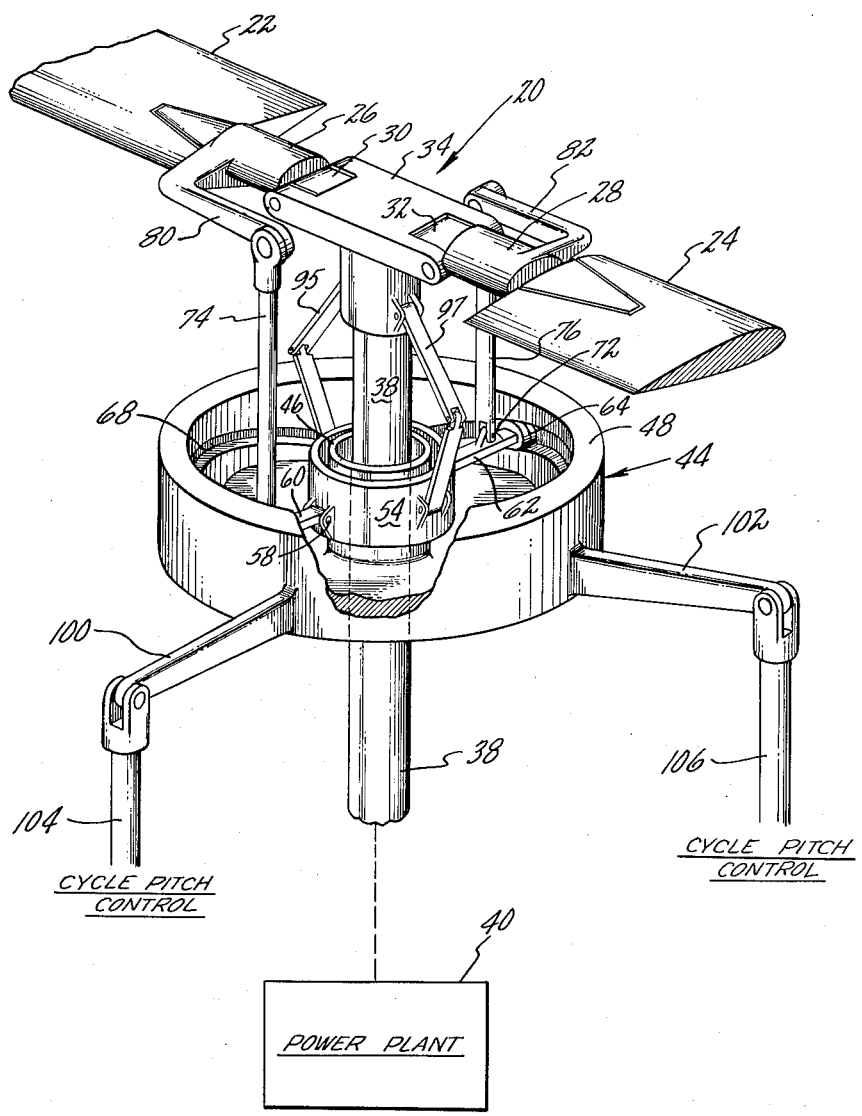
FIG_3

April 24, 1962 P. J. ARCIDIACONO 3,031,017
CYCLIC PITCH CONTROL
Filed Sept. 30, 1959 3 Sheets-Sheet 3
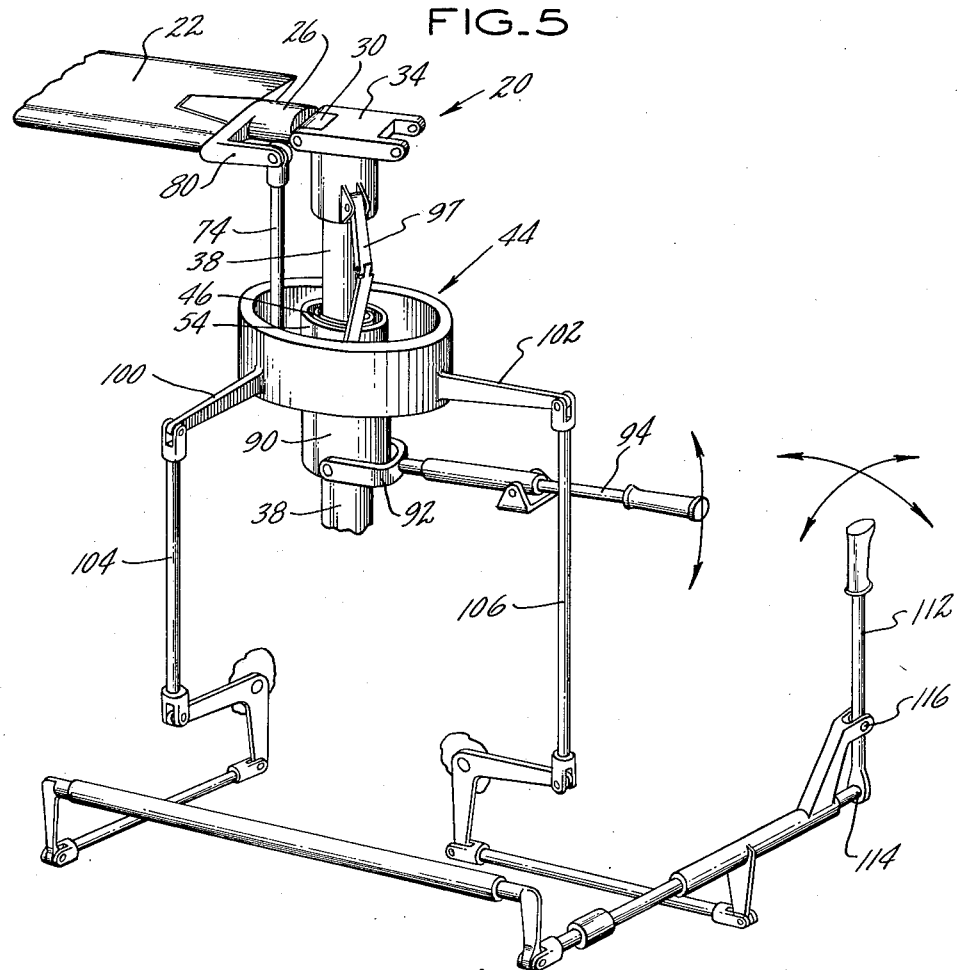
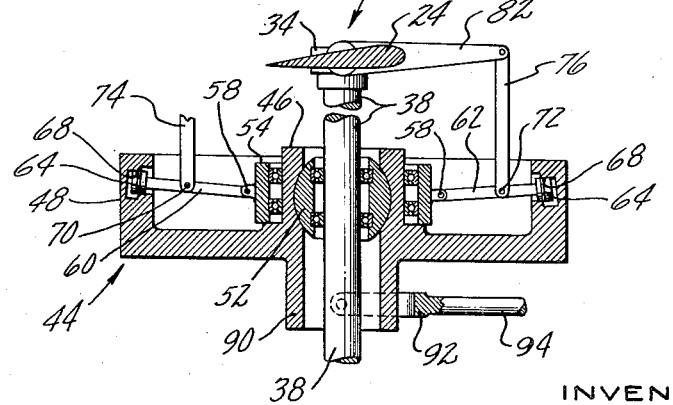
INVENTOR
PETER J. ARCIDIACONO
BY *Leonard F. Wehland*
ATTORNEY

United States Patent Office 3,031,017
Patented Apr. 24, 1962

3,031,017
CYCLIC PITCH CONTROL
Peter J. Arcidiacono, Cromwell, Conn., assignor to United Aircraft Corporation, East Hartford, Conn., a corporation of Delaware
Filed Sept. 30, 1959, Ser. No. 843,400
7 Claims. (Cl. 170—160.25)

This invention relates to vertical lift aircraft and more particularly to cyclic pitch mechanisms for helicopters and the like.

It is an object of this invention to provide a cyclic pitch mechanism for a helicopter rotor which induces second or higher harmonic pitch changing motions to the rotor blades to increase the maximum lift produced by the rotor in forward flight.

It is a further object of this invention to induce such pitch changing motions in a helicopter rotor system which motion is particularly scheduled by suitable means such as a cam track so that at stalling speed, the blades are at or near their effective stall angle continuously throughout each revolution.

These and other objects of this invention will become readily apparent from the following detailed description of the drawings in which:

FIG. 3 is a partial perspective view of a helicopter rotor head including the swash plate cam track mechanism;

FIG. 4 is a schematic illustration in cross section of the FIG. 3 showing; and

FIG. 5 is a schematic layout of the rotor head and the manual controls therefor.

Figure 1:
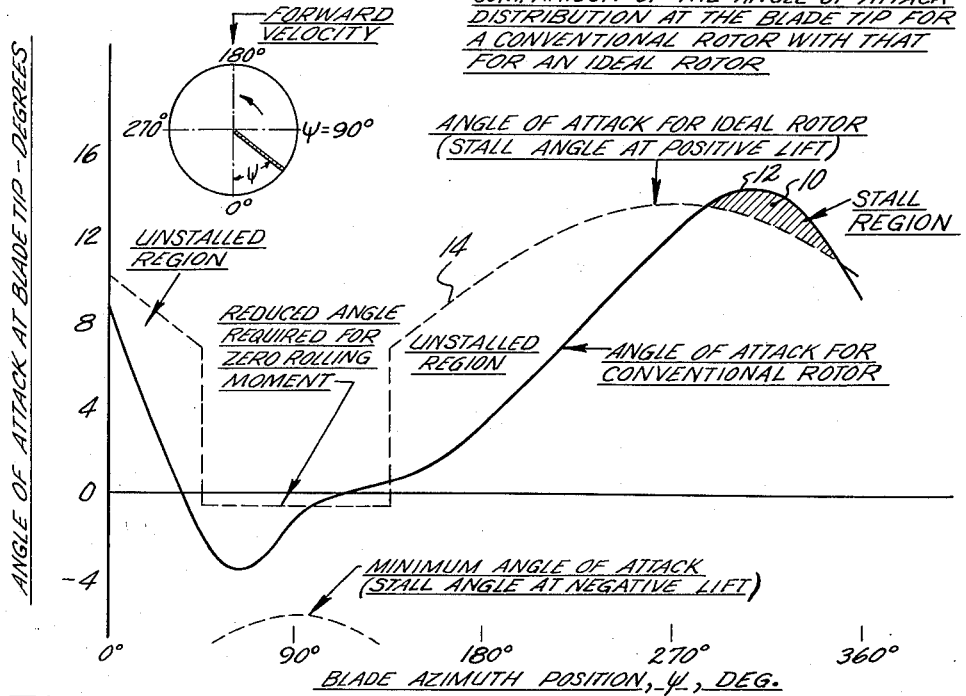
FIG. 1 is a diagrammatic showing of the angle of attack distribution at the rotor blade tip for a conventional helicopter rotor.

The maximum forward speed which a helicopter can obtain is limited by the occurrence of stall on the retreating blades of the rotor. Examination of the rotor angle of attack distribution at stalling speed shows that stall is confined to a relatively small area on the retreating half of the rotor disc as shown, for example, by the region 10 just below angle of attack line 12 in FIG. 1. Such an angle of attack distribution (large unstalled region) is inefficient because the full lift-generating potential of the unstalled portion of the rotor is not realized. The ideal rotor angle of attack distribution at stall can be shown by the curve 14 in FIG. 1. Here stall occurs simultaneously over all parts of the rotor except in a region on the advancing side where reduced angles of attack are required in order to make the rotor rolling moment approximately zero. This rolling moment requirement results from the fact that each blade is hinged at its inboard end.

If the angle of attack distribution of the rotor at stalling speed is made to, as much as possible, approximate the ideal distribution more closely, a higher maximum lift is obtained from the rotor. The greater lift can then be used to support a greater gross weight at a given forward speed or, alternatively, to propel a given gross weight at a greater forward speed.

Figure 2:
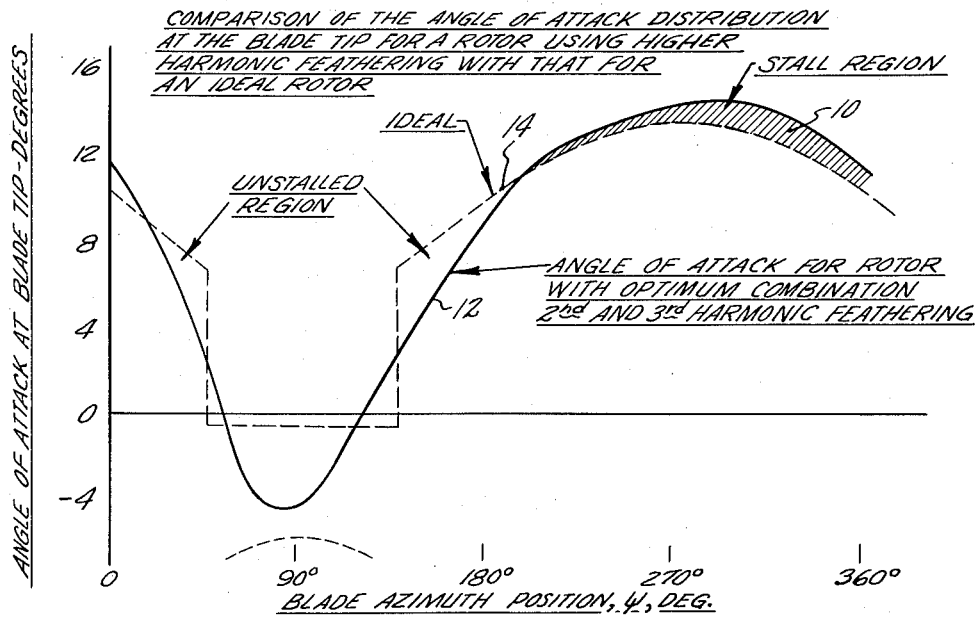
FIG. 2 is a diagrammatic illustration of the angle of attack distribution at the rotor blade tip for a rotor disc utilizing my invention.

According to this invention, the means for modifying the angle of attack distribution of a rotor involves the application of second and higher harmonic feathering control to the rotor blades. First harmonic feathering control (once per revolution variation of blade pitch angle) presently used on conventional rotors cannot be used to modify the angle of attack distribution because the flapping which it induces cancels the desired effects. The flapping response of the blades to higher frequency pitch variations is, however, much smaller. FIG. 2 shows the effect of applying the optimum combination of second and third harmonic feathering control to the rotor blades. As shown in FIG. 2, the application of such control does, in fact, improve the rotor angle of attack distribution. It has been found that the speed of a typical helicopter can be increased significantly by using second and higher harmonic control.

To obtain the pitch changing motion according to this invention and to have the angle of attack distribution conform to a pattern substantially as shown in FIG. 2, the mechanisms of FIGS. 3 through 5 are provided.

Referring to FIGS. 3 and 4, a helicopter rotor head is generally indicated at 20 as having a plurality of blades 22 and 24 mounted for pitch changing movement about their respective spanwise axis on yokes 26 and 28, respectively. The yokes 26 and 28 include flapping hinges 30 and 32, respectively, which in turn are connected to a main support 34. For convenience, conventional lagging hinges are not shown. The main support 34 is suitably connected to a drive shaft 38 which is driven by suitable power plant 40. A swash plate generally indicated at 44 is in the form of a disc-like member having inner and outer collar-like members 46 and 48, respectively.

The drive shaft 38 passes through the inner collar 46 to drive the main support member 34 and rotate the blades. A drive shaft is shown for convenience in the sketch, however, the invention is also applicable to tip driven rotors.

The disc-like swash plate 44 is fixed against rotation by suitable means and engages the drive shaft 38 through means of a ball-type joint 52. This permits tilting movement as well as vertical movement of the swash plate 44 relative to the drive shaft 38 so that conventional first harmonic cyclic pitch and collective pitch control, respectively, is obtained. The inner swash plate collar 46 has connected thereto a rotating, secondary collar 54 with the connection being made by ball bearing means or other suitable mechanism. The secondary collar 54 is driven in rotation by a conventional scissors arrangement 95 and 97 (or some other suitable mechanism) and contains a plurality of pivot connections 58 for laterally extending arms 60, 62 which at their outer ends carry rollers or ball bearings 64. These rollers engage a cam track 68 carried on the inner peripheral surface of the outer collar 48. At a point intermediate the ends of the lateral link 60 and 62 there are provided a plurality of pivot connections 70 and 72 to which are connected vertical links 74 and 76, respectively. These vertical links are in turn connected to the pitch changing horns 80 and 82 of the yokes 26 and 28, respectively.

It can be seen then that for any tilt position of the swash plate 44 the pitch changing motion of the blade will not simply be the usual first harmonic variation obtained with an ordinary flat swash plate but instead will have superimposed on this first harmonic variation a second or even higher harmonic variation or a combination thereof as provided by the profile of cam track 68.

Referring to FIG. 5 the rotor head is shown in schematic fashion only since in this figure it is intended only to illustrate in a crude fashion the manual controls for the rotor head. It is seen herein the swash plate 44 is operatively connected to the main support member 34 by a suitable linkage 97 only one of which is shown for convenience. The drive shaft 38 is connected to the main support member 34 and to the blade 22. The collective pitch control is achieved by means of a depending collar 90 which extends from the inner collar 46 of the swash plate. The collar 90 has connected thereto a yoke 92 and a collective pitch stick 94.

The swash plate 44 also includes outer laterally extending arms 100 and 102 which are connected to vertical links 104 and 106, respectively. The vertical links 104 and 106 as shown in FIG. 5 are suitably connected by other bell cranks, rods and linkages to a cyclic manual pitch control 112. The cyclic pitch stick can be moved lateral about a pivot 114 and fore and aft about a pivot 116 to provide the desirable tilting movement of the swash plate 44.

In the schematic illustration in FIG. 5 the linkages are simplified for convenience. The linkages as shown would feed back to each other but this is of no consequence in regard to the present invention. However, compensating linkages are shown, for example, in Patent No. 2,629,452, issued February 24, 1953, to R. P. Alex, as well as Patent No. 2,759,359, issued August 21, 1956, to H. T. Jensen and H. W. Bonnett. These linkages avoid any feedback motion of the collective pitch stick control to the cyclic pitch control and vice versa.

As a result of this invention, a cyclic pitch changing system for a helicopter and the like has been provided whereby a greater percent of the full lift potential of the rotor disc is obtained. Furthermore, a cyclic pitch changing system is provided that is mechanically very simple and can provide almost any harmonic motion in the cyclic pitch changing pattern. The simplicity of the arrangement inherently results in relatively light weight and highly efficient mechanism.

Although one embodiment of this invention has been illustrated and described herein, it will be apparent that various changes may be made in the construction and arrangement of the various parts without departing from the scope of the novel concept.

I claim:

1. A sustaining rotor for a vertical lift aircraft comprising a rotor head having a plurality of blades carried thereby for pitch changing movements relative thereto, drive means for said rotor including a drive shaft, a swash plate fixed against rotation, means interconnecting said swash plate with said blades, means for moving said swash plate to collectively vary the pitch of said blades, means for tilting said swash plate including mechanism for varying the cyclic pitch of said blades in accordance with a first harmonic pitch changing schedule for each revolution of the rotor head, and means forming a part of said mechanism and operative in cooperation with said swash plate and said blades to superimpose a secondary cyclic pitch changing scheduled motion to said blades whereby the resultant cyclic pitch changing movement of said blades is a higher than first harmonic per revolution of said blades.

2. A sustaining rotor according to claim 1 wherein said last-mentioned means includes a contoured cam surface and cam follower forming a connection between said swash plate and said blades.

3. In a helicopter type aircraft having a rotor, said rotor having a plurality of blades mounted for pitch changing movements relative thereto, means for driving said rotor including a drive shaft connected thereto, a swash plate fixed against rotation and comprising a disc-like member having inner and outer collar-like members, said drive shaft for said rotor passing through said inner collar, manual means for moving said swash plate vertically, manual means for tilting said swash plate, a cam track carried by said outer collar and having an irregular profile, linkage means pivotally supported by said inner collar and having a cam follower engaging said track, and means interconnecting said linkage means and said blades to collectively and cyclically vary the pitch of said blades, said cam track imposing second or higher harmonic cyclic pitch changing motion on said blades irrespective of the movement of said swash plate.

4. In an aircraft having a sustaining rotor and a plurality of blades carried thereby, a drive shaft for said rotor, driving means connected to said shaft, collective pitch changing means for said blades, means for cyclically varying the pitch of said blades during rotation of said rotor, the cyclic pitch changing movements of said blades being substantially first harmonic in frequency per revolution whereby the pitch of the blade is relatively higher during its retreating motion than during its advancing motion, and means forming a part of said cyclic pitch control and operatively connected to said blade for superimposing a secondary once-per-revolution pitch changing motion on said blades whereby the resultant pitch changing motion of said blade in each cycle is a second harmonic or higher whereby the unstalled operation of said blade is varied per revolution of said blade.

5. A sustaining rotor for a vertical lift aircraft comprising a rotor head having a plurality of blades carried thereby for pitch changing movements relative thereto, drive means for said rotor including a shaft and a power plant driving the shaft, a swash plate fixed against rotation, means interconnecting said swash plate with said blades, means for moving said swash plate to collectively vary the pitch of said blades, means for tilting said swash plate including mechanism for varying the cyclic pitch of said blades in accordance with a first harmonic sinusoidal schedule for each revolution of the rotor head, means forming a part of said cyclic pitch varying mechanism operative in cooperation with said swash plate and said blades to superimpose a secondary cyclic pitch changing scheduled motion to said blades whereby the resultant cyclic pitch changing movement of said blades contains a second harmonic component, said last-mentioned means including a profiled cam means carried by said swash plate, a cam follower adapted to traverse said cam means with each revolution of the rotor head and blades, a first link pivoted at one end to said rotor head and at its other end carrying said cam follower, and a second link connecting one of said blades to said first-mentioned link.

6. A sustaining rotor for a vertical lift aircraft comprising a rotor head having a plurality of blades carried thereby for pitch changing movements relative thereto, drive means for said rotor including a shaft and a power plant driving the shaft, a swash plate fixed against rotation, means interconnecting said swash plate with said blades, means for moving said swash plate to collectively vary the pitch of said blades, means for tilting said swash plate including mechanism for varying the cyclic pitch of said blades in accordance with a first harmonic sinusoidal schedule for each revolution of the rotor head, means forming a part of said cyclic pitch varying mechanism operative in cooperation with said swash plate and said blades to superimpose a secondary cyclic pitch changing scheduled motion to said blades whereby the resultant cyclic pitch changing movement of said blades contains a second harmonic component, said last-mentioned means including a peripheral vertical extension on said swash plate, a profiled cam means carried by said extension, a cam follower adapted to traverse said cam means with each revolution of the rotor head and blades, a first link pivoted at one end to said rotor head and at its other end to said cam follower, and a second vertical link extending from a point intermediate said ends of said first link and connecting one of said blades to said first-mentioned link.

7. A sustaining rotor for a vertical lift aircraft comprising a rotor head having a plurality of blades carried thereby for pitch changing movements relative thereto, drive means for said rotor, including a shaft and a power plant driving the shaft, a swash-plate fixed against rotation, means interconnecting said swashplate with said blades, means for moving said swashplate to collectively vary the pitch of said blades, means for tilting said swashplate including mechanism for varying the cyclic pitch of said blades in accordance with a first harmonic sinusoidal schedule for each revolution of the rotor head, means forming a part of said cyclic pitch varying mechanism operative in cooperation with said swashplate and said blades to superimpose a secondary cyclic pitch changing scheduled motion to said blades whereby the resultant cyclic pitch changing movement of said blades contains a second harmonic component, said last-mentioned means including vertical annular extensions forming the inner hub and outer rim respectively of said swashplate, a profiled cam means carried by said outer rim, a cam follower for each of said blades adapted to traverse said cam means with each revolution of the rotor head and blades, a ring rotatably mounted on said hub, a first link pivoted at one end to said ring and at its other end carrying said cam follower, and a second link connecting each blade to said first-mentioned link for varying the pitch of said blade.

References Cited in the file of this patent

UNITED STATES PATENTS

| | | |
|---|---|---|
| 2,143,024 | Nemeth | Jan. 10, 1939 |
| 2,372,481 | Gagas | Mar. 27, 1945 |
| 2,432,677 | Platt | Dec. 16, 1947 |
| 2,512,461 | Jenny | June 20, 1950 |
| 2,611,441 | Slechta | Sept. 23, 1952 |
| 2,620,888 | Avery | Dec. 9, 1952 |
| 2,652,898 | Renoux | Sept. 22, 1953 |
| 2,669,313 | Lightfoot | Feb. 16, 1954 |
| 2,731,095 | Leka | Jan. 17, 1956 |
| 2,735,500 | Perry | Feb. 21, 1956 |
| 2,748,876 | Daland et al. | June 5, 1956 |
| 2,936,836 | Ellis | May 17, 1960 |
| 2,983,319 | Kaman et al. | May 9, 1961 |